United States Patent

Oestreich et al.

Patent Number: 5,101,166
Date of Patent: * Mar. 31, 1992

[54] SYSTEM FOR MEASURING THICKNESS OF HIGH SPEED MOVING FILM

[75] Inventors: Roger C. Oestreich, River Falls, Wis.; Richard Rosik, Minneapolis, Minn.

[73] Assignee: Modern Controls, Inc., Minneapolis, Minn.

[*] Notice: The portion of the term of this patent subsequent to Aug. 7, 2007 has been disclaimed.

[21] Appl. No.: 468,263

[22] Filed: Jan. 22, 1990

[51] Int. Cl.⁵ ............................................. G01R 27/26
[52] U.S. Cl. .................................. 324/671; 324/690; 324/558
[58] Field of Search .............. 324/663, 671, 686–688, 324/690, 558, 559; 73/159

[56] References Cited

U.S. PATENT DOCUMENTS

| | | | |
|---|---|---|---|
| 3,300,716 | 1/1967 | Engert | 324/686 X |
| 3,475,956 | 11/1969 | Langlois et al. | 73/159 |
| 3,718,037 | 2/1973 | Stringer et al. | 73/159 X |
| 4,449,398 | 5/1984 | Williams | 73/159 |
| 4,947,131 | 8/1990 | Mayer et al. | 324/671 |

Primary Examiner—Jack B. Harvey
Attorney, Agent, or Firm—Palmatier & Sjoquist

[57] ABSTRACT

An on-line capacitance sensing system, including a capacitance sensor, for measuring changes in thickness of a plastic film which passes over the sensor in contacting relationship; the sensor is mounted to a carriage which may be reciprocated transversely across the width of the film, and a partial vacuum is applied to the sensor to assist in holding the moving plastic film in contacting relationship against the sensor.

2 Claims, 3 Drawing Sheets

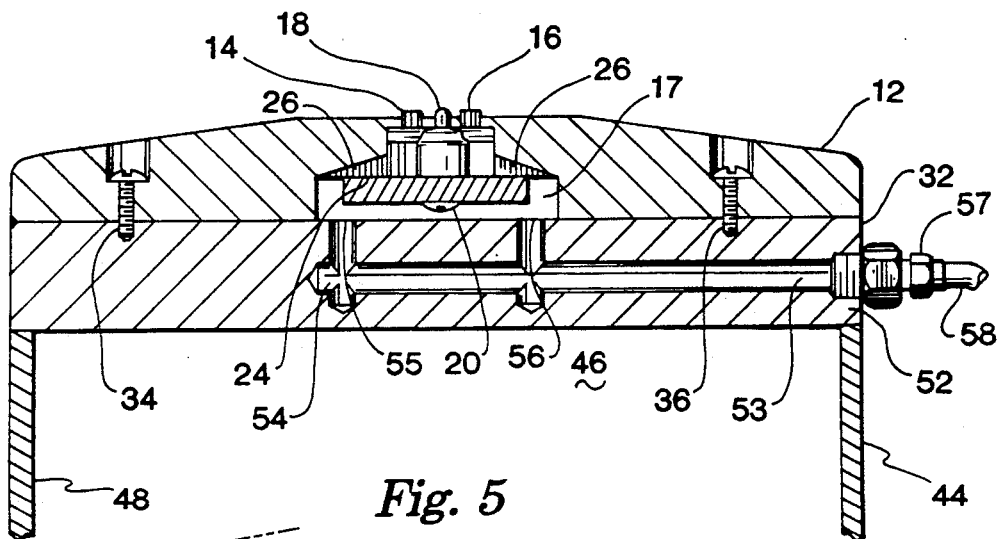
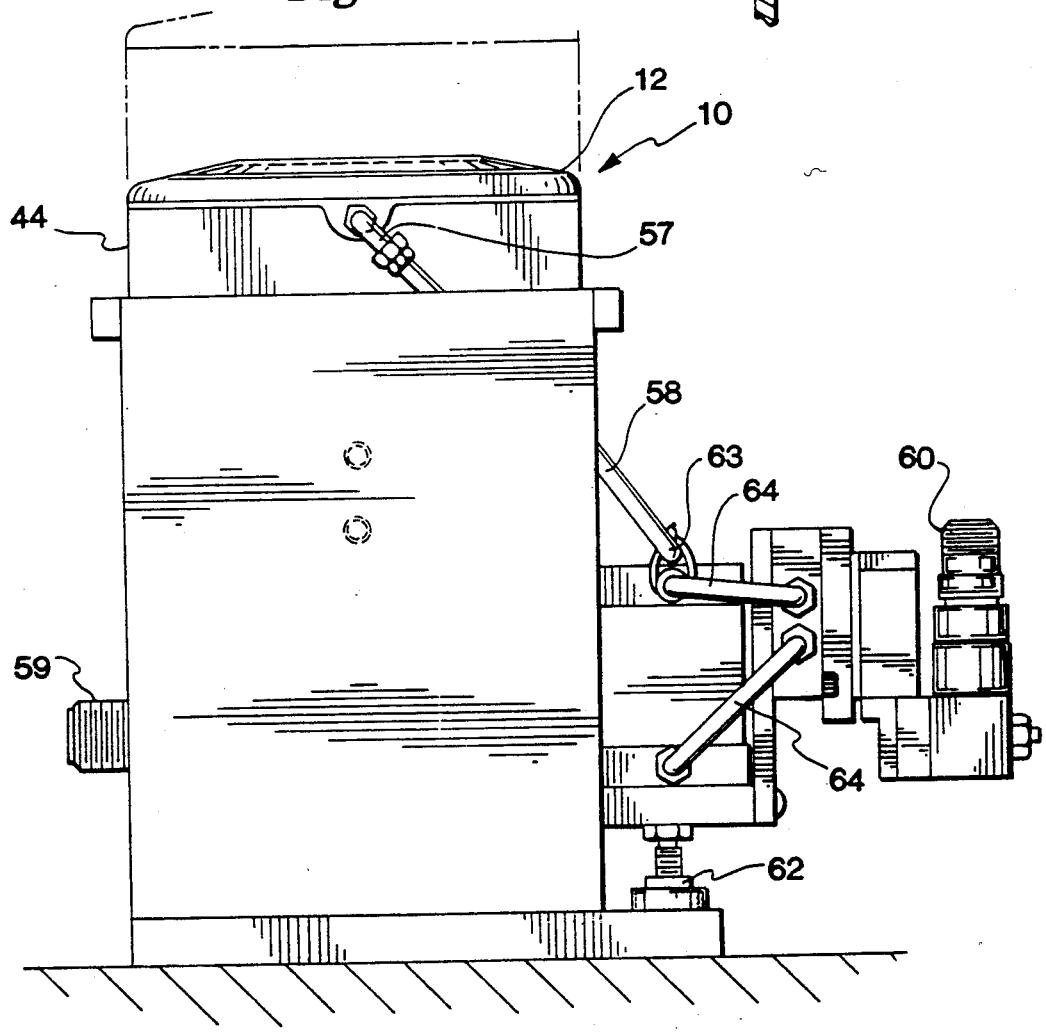

SYSTEM FOR MEASURING THICKNESS OF HIGH SPEED MOVING FILM

BACKGROUND OF THE INVENTION

The present invention relates to an apparatus for measuring the thickness of films such as plastic films, wherein such measurements are made by detecting capacitance variations when the film is placed in close proximity to a sensing head. Variations in film thickness cause corresponding dielectric variations which are detected as variations in measured capacitance.

The use of capacitance measuring sensors for measuring film thickness is known in the art. One sensor is disclosed in U.S. Pat. No. 3,764,899, owned by the assignee of the present invention. This patent discloses that film thickness may be measured by passing the film through a capacitance sensor, wherein variations in film thickness are sensed as dielectric thickness variations between the capacitance members and are detected as variations in a signal which is applied to the capacitance members.

Another capacitance measuring device is disclosed in British Patent No. 2038483, also owned by the assignee of the present invention. This patent is directed to a capacitance sensor for sensing film thickness changes wherein the film is passed over capacitance elements arranged in a side-by-side relationship. Variations in film thickness are detected as variations in a signal applied to an electrode positioned in an air gap over which the film is moved. A plurality of passages are formed in the sensor.

Still another capacitance measuring device is disclosed in pending U.S. Patent Application Ser. No. 341,493, owned as well by the assignee of the present invention. That patent application is directed to an improvement over the aforementioned British patent, wherein the invention is constructed to solve the problem and minimize the effects of temperature changes on the capacitance measurements, both in terms of temperature effects causing relative expansion and contraction of the dimension of the measuring components, and also in terms of the temperature effects causing relative changes in the dielectrics found between capacitance members.

While this prior art represents significant advances in obtaining accurate measurements of film thickness by detecting capacitance variations when a film is placed in proximity to a sensor, there is a problem which has not been solved. Specifically, applicants have discovered that contact between a film and the sensor is absolutely essential to achieve thickness readings with acceptable margins of error. This is a particularly difficult problem in the on-line application of capacitance sensors when ultra-repeatability is needed.

There are several potential sources or causes for loss of contact between the sensor and a film. Film supporting or conveying systems may cause loss of contact. For example, if rollers supporting the film are not precisely parallel the film tension may change and contact with the sensor head may be lost. The dimensions or diameter of the film rollers may vary thereby causing the film to be supported at different levels across the extent of the film. Additionally, the suspension of the guides or rollers carrying the film, even down to the bearings upon which the rollers rotate, may have an effect on the film tension and thus, contact with the sensor.

A second source of lost or varying sensor to film contact is that the film may be wrinkled. Even slight wrinkling can cause variances in the film contact with the sensor and thus cause fluctuations in the sensitivity and accuracy of measurements.

Even if film rollers and guides are machined to very precise tolerances and even if extremely stringent quality control is exercised so that the film emerges from the die without a wrinkle, there is still another cause of loss of contact between the film and the sensor. That is, applicants have noted that as the sensor head approaches the edges of the in-process film, the film tension may change causing the film to lose contact with the sensor head.

During testing of capacitance sensors, it has been noted that without a solution to this contact problem, e.g., additional expensive precise tooling of processing equipment, the practical monitoring of in-process films may be unworkable. This is particularly true when thin films, for example with a thickness of below 50 mils, are being assessed.

In the case of thin films, the influences of lost contact are bigger because the relative part of the stray field is bigger. Typical sensitivity for a 20 mil cast film is in the range of 15% for 0.1 mm of distance between the sensing head and the film.

By way of contrast, in the case of thicker films, the electrical field at the top of the sensor is concentrated or guided by the film itself; the relative part of the stray field is smaller. Therefore, the influences on the field by position changes away from the top of the sensor are smaller. Typical sensitivities if contact with the sensor is lost are in the range of 10% per 0.1 millimeter of distance (with a 150 micron material).

Thus, one of the biggest problems in the measurement of variations in film thickness using capacitance variations is keeping the film, particularly thin film, in contact with the sensor head all across the film surface and as the film is being processed.

SUMMARY OF THE INVENTION

An on-line capacitance sensor is provided for measuring changes in thickness of a plastic film which passes over the sensor in contacting relationship. The sensor is constructed to include an elongated electrode centered between two adjacent electrodes so that an air gap exists between the center electrode and the adjacent electrodes. The invention minimizes loss of contact between the sensor and a film by providing a vacuum acting through the air gap between the electrodes and exerting upon the film a force in the direction toward the electrodes.

It is an object of the present invention to provide a measurement device having a sensor which minimizes measurement error resulting from loss of contact between the sensor and a film.

It is another object of the present invention to provide a capacitance sensor head which is operable to achieve a high degree of repeatability, that is, a sensor operable to within plus or minus 1% or plus or minus 0.01 mil of the thickness of the material being assessed.

It is another object of the present invention to provide an on-line capacitance sensor which enables the instantaneous assessment of film or web thickness, minimum and maximum values, last pass average, and standard deviation.

It is an advantage of the present invention that essential contact between the sensor and a film may be maintained across the entire width of a film while the sensor traverses the film, thereby minimizing the percent error and increasing repeatability.

These and other objects and advantages of the present invention will be understood with reference to the following specification and appended drawings and claims.

BRIEF DESCRIPTION OF THE DRAWINGS

FIG. 4 shows a cross-sectional view taken along the line 4—4 in FIG. 1.

FIG. 5 shows an elevational view of the sensor of the present invention.

DESCRIPTION OF THE PREFERRED EMBODIMENT

Figure 1:
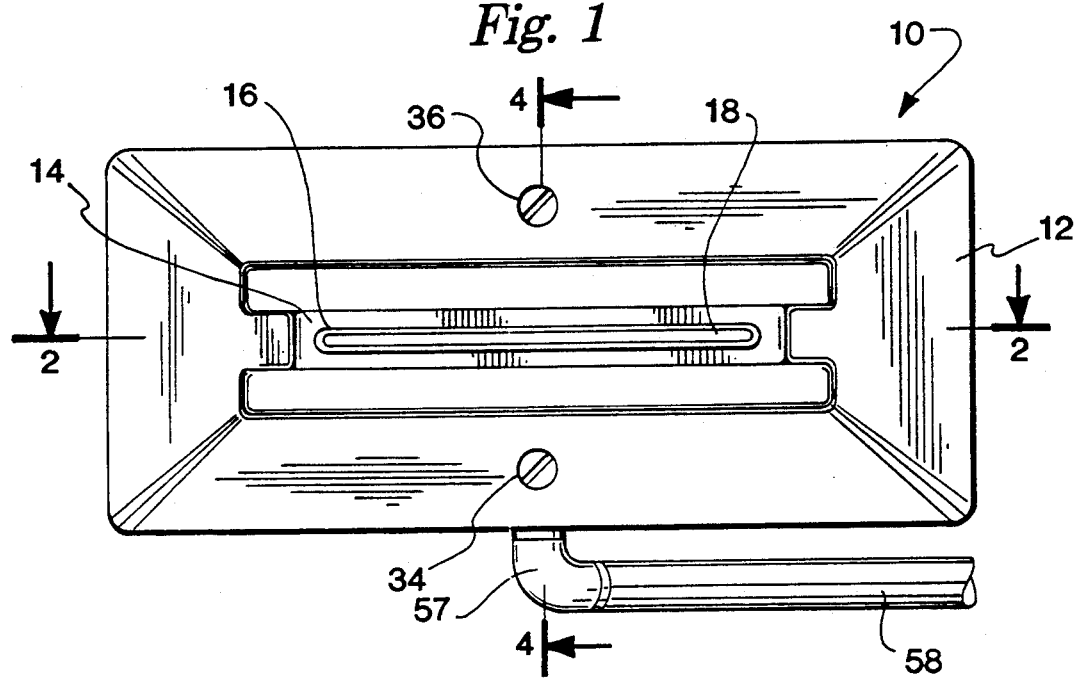
FIG. 1 shows a top plan view of the sensor head of the present invention.
Figure 2:
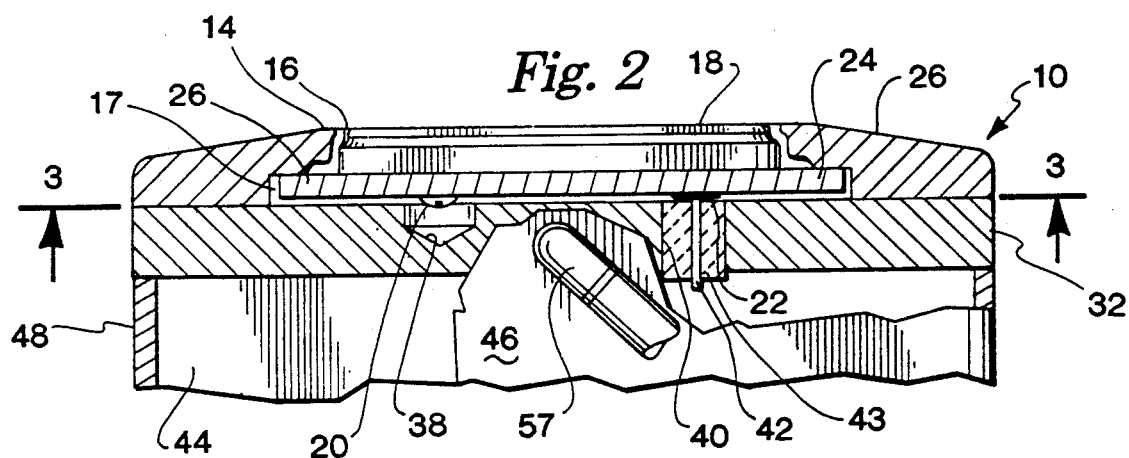
FIG. 2 shows a partial cross-sectional view taken along the lines 2—2 in FIG. 1.
Figure 3:
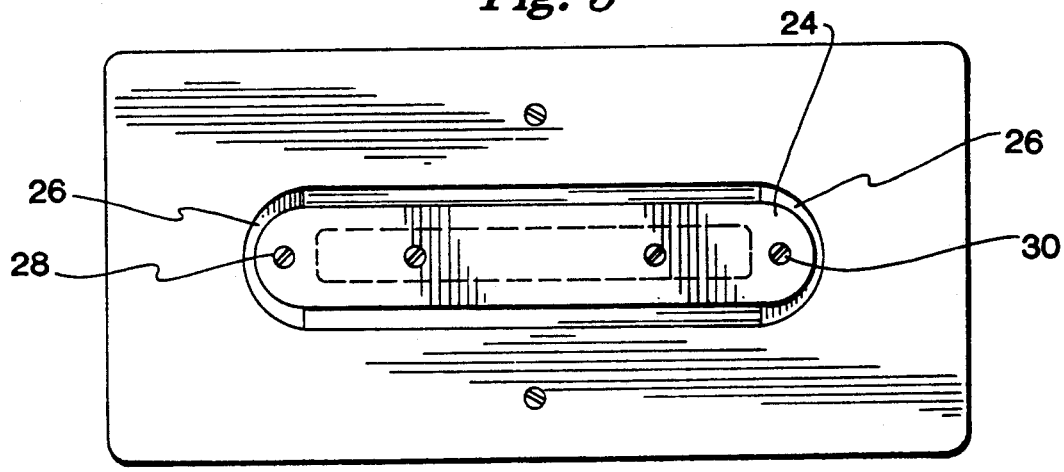
FIG. 3 shows a cross-sectional view taken along the line 3—3 in FIG. 2.

The figures show a sensor 10 constructed and used according to the teachings of the present invention. Sensor 10 has a top portion or housing 12 made from Invar. The top 12 has a planar area 14 and a slot or elongated air gap 16 formed through the flat planar area 14. The slot 16 opens into an inner, central chamber 17 in top 12. An Invar sensor head or electrode 18 is rigidly fixed within slot 16 to provide an approximately equal air gap around all sides of the Invar sensor head 18. The sensor head 1B is fixed by screws 20 and 22 to a Vycor support or plate 24. The plate 24 is attached to the top 12 by screws 28 and 30. The top 12 is rigidly fixed to a bottom plate or base 32 by means of screws 34, 36. Top 12 has plate mounting seats 26, located generally at the two opposed ends of the elongated air gap or slot 16. The seats are adapted to receive the plate 24 and screws 28 and 30 holding the plate 24 to the top 12. All adjacent materials in the top 12 with the exception of the screws are formed of the same material and all these component parts of the sensor 10 are rigidly affixed together.

Screws 20 and 22 project downwardly partially into recess 38 and aperture 40. Aperture 40 is a clear hole through the base 32 and may have an insulator 43 placed therein. A conductor 42 may be passed through aperture 40 and insulator 43 and may be secured to screw 22. It is this conductor that transmits the signals necessary for determination of capacitance measurement. The conductor 42 extends into foundation 44. The base 32 is provided with an aperture 52 leading to boring 53. At or near the interior end 54 of boring 53, the base 32 is provided with apertures 55, 56 providing for fluid communication with chamber 17. A vacuum fitting or port 57 is connected to aperture 52 and an air inlet and outlet tube 58 is attached to the port 57.

The sensor electrical connector 59 is shown in FIG. 5. This connector is used in completing the electrical connections between the sensor 10 and remaining components of the sensor system 70 (see FIG. 6). For control of sensor 10 motion and the vacuum, the sensor 10 is provided with solenoid valve electrical connection 60. The sensor 10 also includes adjustment means 62 for positioning the sensor 10 relative to the sheet material being assessed. Clips 63 are provided for air and electrical support lines and tubes 64.

It should be noted from the above description and FIGS. 1–4 that there is a fluid communication pathway between the air gap or slot 16 in top 12 around sensor head 18 into chamber 17 and thereby into boring 53. Thus, a vacuum applied or generated in chamber 17 will have the tendency to draw air downwardly toward and about the sensor head 18 through the fluid communication path, thereby creating a downward acting flow of air and force around the sensor head 18.

Two of the advantages of the present invention should be noted specifically. First, as disclosed in copending application Ser. No. 341,493, the entire sensor device is relatively stable and unaffected by wide variations in temperature. Secondly, applicants have constructed a novel sensor 10 having a fluid flow path whereby a vacuum creates a downwardly acting force at the area where the sensor top 12 comes into contact with a plastic film being accessed thus ensuring that the film remains in contact with the sensor head. Reversing the air flow through the fluid communication or flow path enables the sensor top 12 to be freed from dust or other debris after the sensor 10 is withdrawn from the plastic film.

Figure 6:
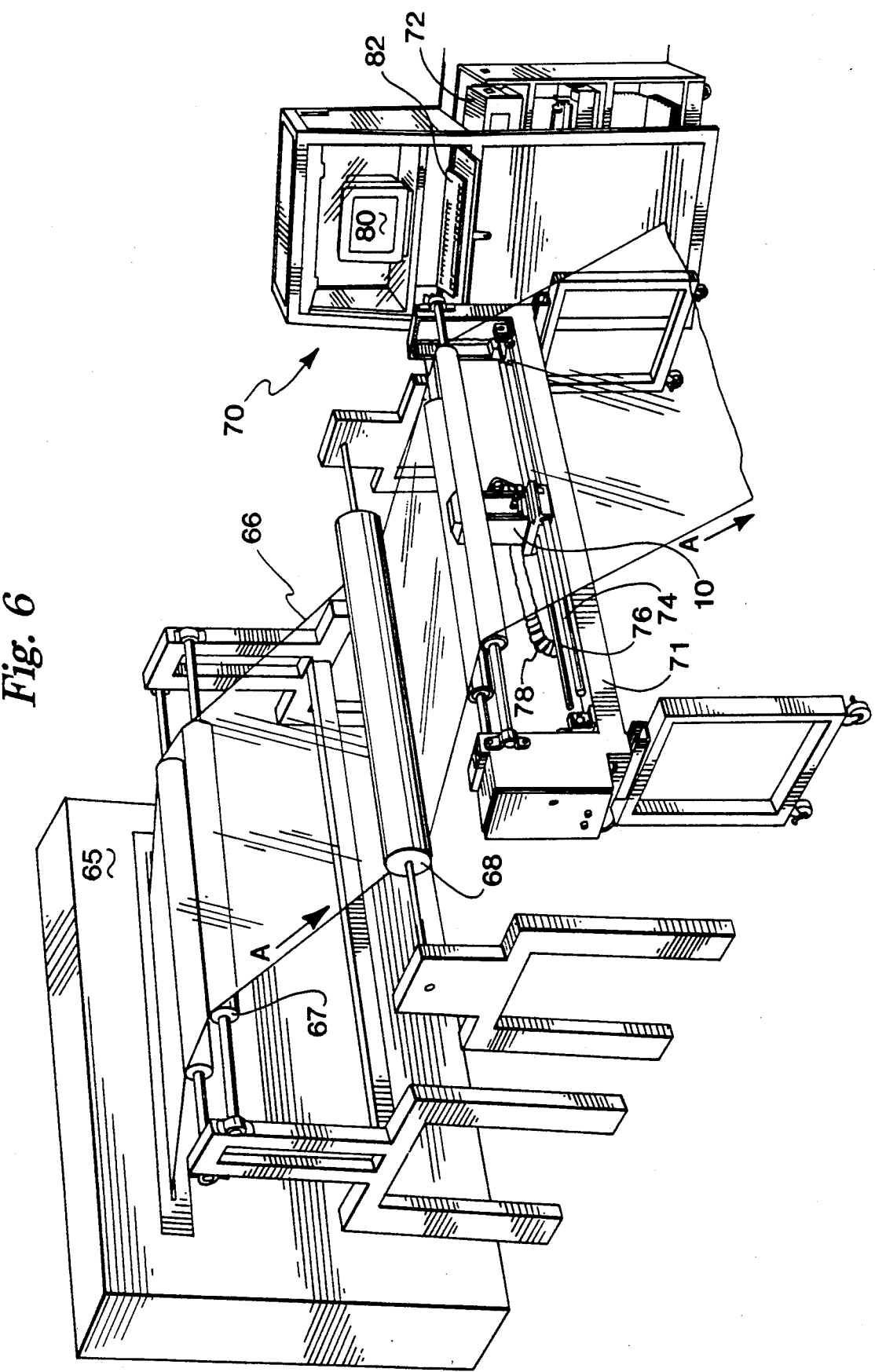
FIG. 6 partially depicts a film processing line and shows how the present invention may be disposed therein.

FIG. 6 depicts a sensing system 70 using the sensor 10 of the present invention and represents a typical on-line installation and use.

A film die 65 is producing a continuous film of plastic 66. The film 66 is transported in the direction away from the die indicated by arrow A. Support rollers 67, including a tensioning roller 68, are provided to support and guide the film 66. After passing over the sensing assembly 70 the film 66 continues in the direction of an accumulating roll (not shown).

The total sensor assembly 70 is made up of the sensor 10, a sensor transporter 71 and an analysis computer 72. The sensor 10 is mounted for reciprocal motion across or transverse to the processing path of a film material 66 on parallel rails 74 and 76. The sensor's 10 transverse travel beneath the web or film 66 being accessed may be controlled by conventional means such as pneumatic power or mechanical linkages. The sensing assembly 70 depicted is easily movable and may be adapted to be inserted in virtually any on-line application; the location depicted is for representational purposes only.

The sensor 10 is connected to the analysis computer 72 by a computer communication link 78. The computer 72 and related peripherals include display terminal 80 and input terminal 82. The analysis computer 72 may be remote from the on-line location. The computer 72 and associated display terminal 80 may provide graphic and digital display of sensor 10 status, thickness value of the assessed film and sensor 10 position beneath the film.

The present invention may be embodied in other forms without departing from the spirit or central essential attributes thereof. It is therefore desired that the present embodiment be considered in all respects as illustrative and not restrictive, reference being made to the appended claims rather than to the foregoing description to indicate the scope of the invention.

What is claimed:

1. A capacitance sensor for measuring thickness and thickness variations in film material passed over and in contact with a sensor, comprising:

a) a housing having an upper surface with a generally central, elongate slot therethrough, said slot opening into an enlarged recess extending through the bottom of said housing;

b) a sensor support affixed to said housing in said enlarged recess;

c) a sensor electrode affixed to said sensor support, said sensor electrode having an upstanding elongated portion smaller than said elongate slot, said upstanding portion being positioned centrally in said slot and extending upwardly to the height of the upper surface of said housing, providing a uniform opening into said recess in said housing, about all sides of said upstanding portion of said sensor electrode; and d) a base attached to a lower side of said housing, said base having at least one opening therethrough, said base having means for providing a partial vacuum in fluid communication with said uniform opening through said base, whereby said partial vacuum is in fluid communication around said sensor electrode and sensor support and to said elongate slot in said housing, and whereby said vacuum exerts a force attracting said film material to said upper surface of said housing in the direction of said sensor electrode.

2. The sensor of claim 1, wherein an electrically conductive fastener attaches said sensor support to said sensor electrode, said conductive fastener having attached thereto a conductor.

* * * * *